Aug. 20, 1935.   R. E. LEPPO   2,012,103
TRAILER COUPLING
Filed Oct. 20, 1930   3 Sheets-Sheet 2
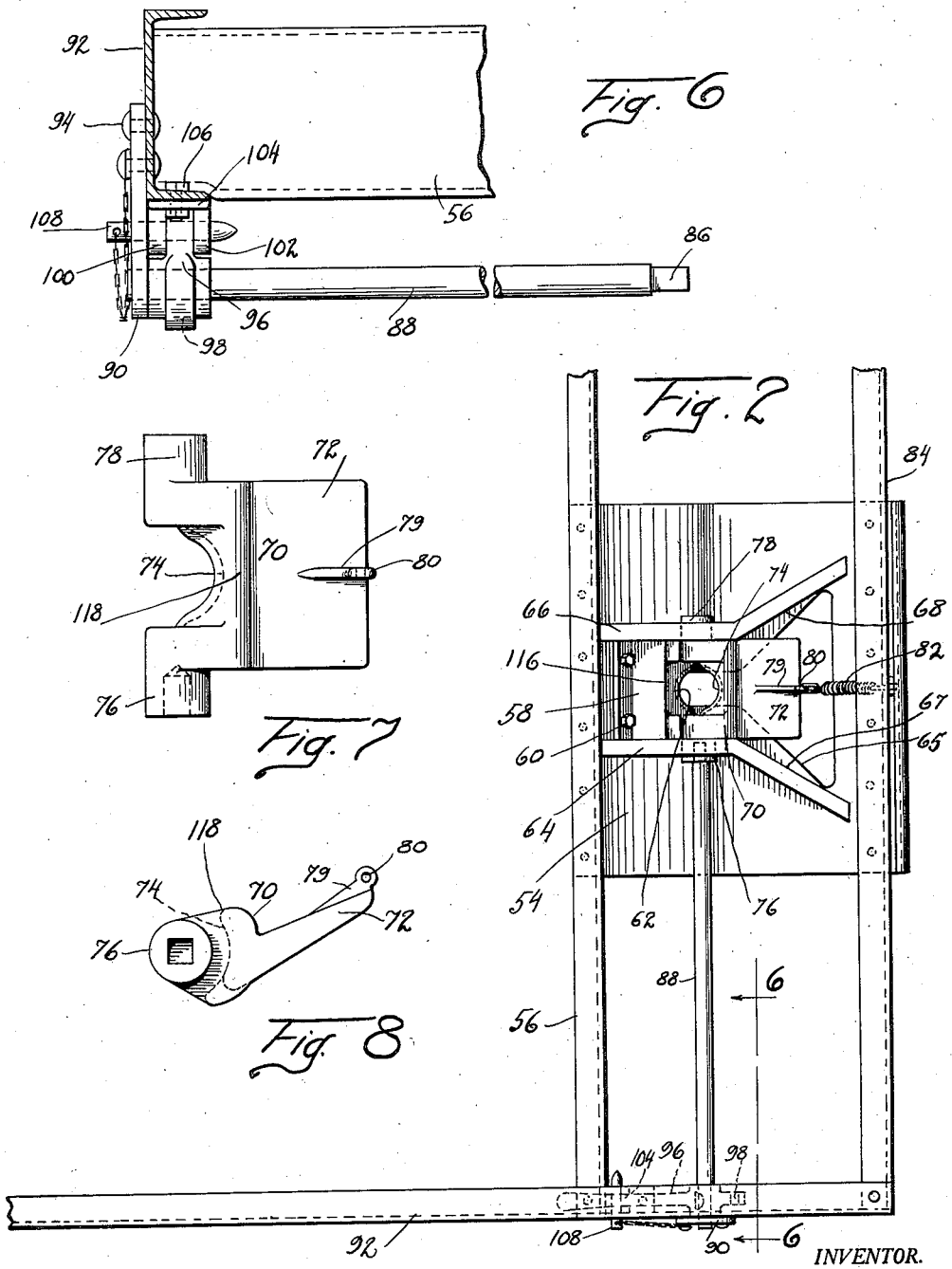
INVENTOR.
Ralph E. Leppo
BY
ATTORNEYS

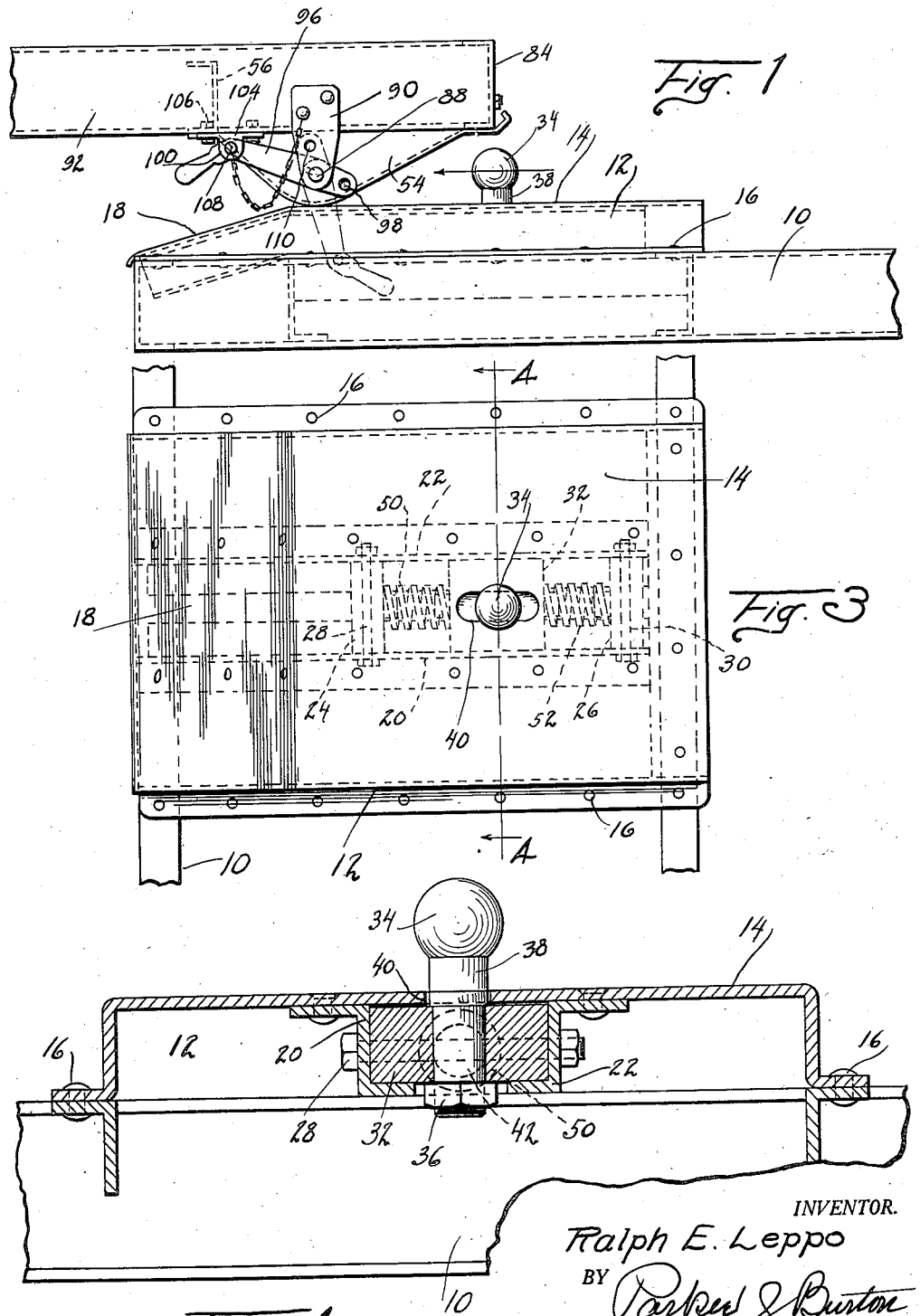

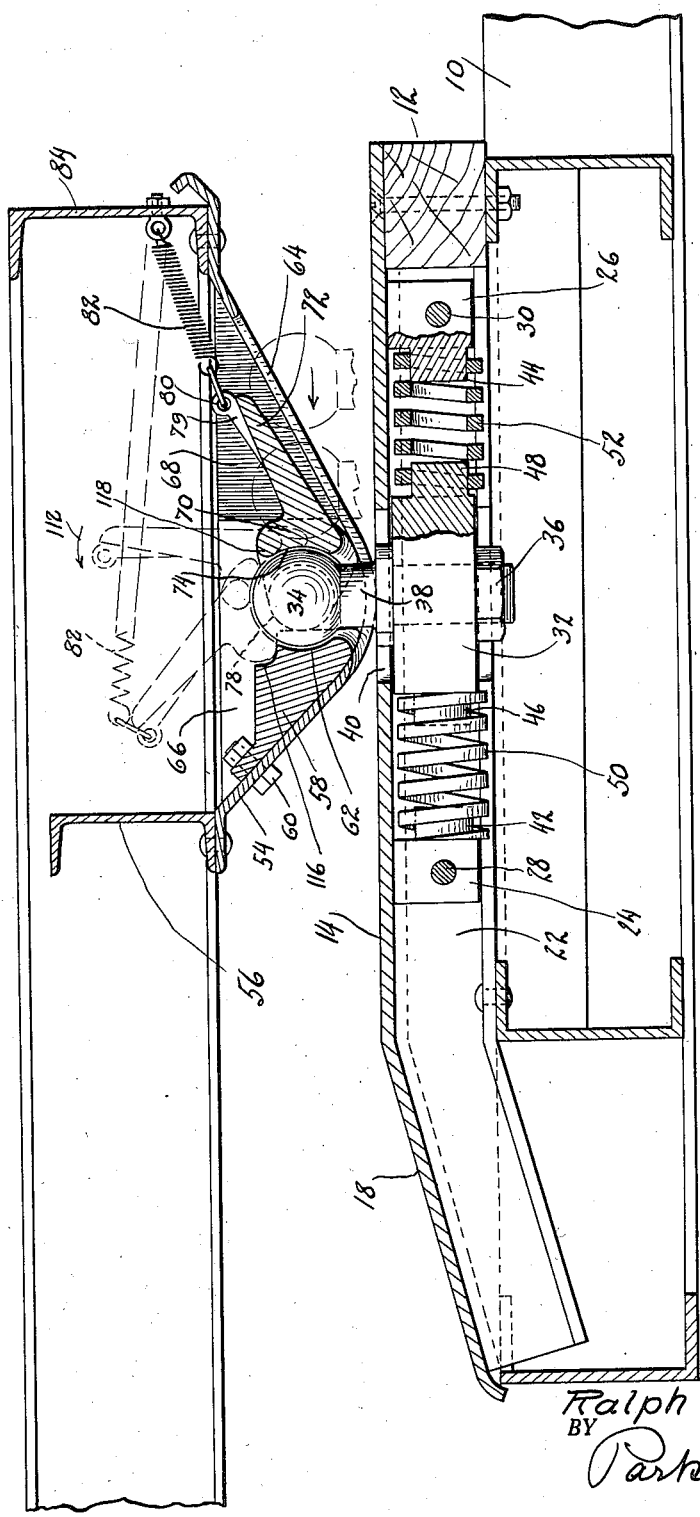

Patented Aug. 20, 1935

2,012,103

UNITED STATES PATENT OFFICE 2,012,103

TRAILER COUPLING

Ralph E. Leppo, Inkster, Mich., assignor of one-half to Stephen A. Griggs, Detroit, Mich.

Application October 20, 1930, Serial No. 489,806

7 Claims. (Cl. 280—33.1)

My invention relates to improvements in trailers and particularly to improved mechanism whereby a two wheel semi-trailer may be coupled to a tractor vehicle.

An object of my invention is to simplify the operation of coupling a semi-trailer vehicle to its tractor and, at the same time, to provide a coupling which permits universal movement between the two coupled elements while maintaining a secure connection under all conditions.

More specifically, it is an object of my invention to provide a ball and socket coupling between tractor and trailer wherein the socket includes a movable member which is adapted to shift from its normal position upon engagement with the ball to permit entrance of the ball within the socket and subsequently automatically return to its normal position, in which position the ball is retained firmly in the socket.

A further object of my invention is to provide, in conjunction with such a universal coupling, means whereby the semi-trailer is supported at four points, just as is the ordinary four wheel vehicle. That is to say, means are associated with my improved universal coupling whereby the front end of the semi-trailer, which is supported by the rear of the tractor vehicle, rests upon a supporting surface at each side thereof rather than simply upon the coupling which is located centrally of the two sides.

Another object of my invention is to so design this four point suspension that it is available in all relative positions of trailer and tractor. In my improved structure it is immaterial whether or not the tractor vehicle extends at right angles to the trailer, or even doubled back at an acute angle therewith. This greatly facilitates maneuvering and unloading of the trailer.

A further very important object of my invention is to eliminate a substantial number of the elements customarily utilized in a tractor trailer coupling mechanism and simplify the tractor for the purpose of reducing the manufacturing costs. In securing this improved result I contemplate arranging a fixed element upon a tractor and another fixed element upon a trailer, which elements are adapted to provide a large bearing area for supporting the front end of the trailer upon the tractor as indicated in the paragraph above, and which also permit swinging movement in a horizontal plane as well as rocking movement in a vertical plane. These movements are essential to successful tractor trailer couplings. Hitherto tractor trailer couplings have customarily included a fifth wheel bearing member adapted to support the front end of the trailer, which fifth wheel was pivoted in a suitable manner, as upon a horizontal pin, for swinging movement in a vertical plane. The coupling between the front end of the trailer and the fifth wheel of the tractor was of a construction to permit swivelling movement between the tractor and trailer for turning purposes, etc.

My improved coupling eliminates the necessity for the usual fifth wheel coupling, exclusive of the socket member within which a ball may be locked. Two perfectly rigid members, of simple design and low cost, cooperate with one another to permit universal movement between the tractor and trailer.

Still another object of my invention is to provide easily manipulable locking mechanism for positively retaining the ball within the socket in addition to the means whereby it is normally retained in such position, the said locking mechanism being adapted to positively actuate the movable member of the socket to permit release of the ball therefrom upon disengagement of the trailer from the tractor. Means are provided whereby this movable socket member may be locked in either its open or closed position, but it is only necessary to manipulate the member for the purpose of releasing the ball from within the socket. As heretofore stated, the ball itself shifts the member upon engagement therewith during the coupling operation.

Other objects and meritorious features of my invention reside in the simplicity of arrangement and minimum of parts which I have utilized to accomplish the above objects, and will be apparent from the following description taken in conjunction with the drawings wherein:

Fig. 1 illustrates the two units about to be coupled,

Fig. 2 is a top plan view of the front end of the trailer, showing the socket element, Fig. 3 is a top plan view of the rear end of the tractor, showing the ball, Fig. 4 is a section on line 4—4 of Fig. 3, Fig. 5 is a central longitudinal section through the ball and socket assembly in their coupled position, Fig. 6 is a section of 6—6 of Fig. 2, Fig. 7 is a detail of the movable socket element, and Fig. 8 is an elevation thereof.

Trailers of the semi-trailer, or fifth wheel, type are customarily provided with some means at the front thereof and on each side for supporting the structure when it is not coupled to a tractor.

This is essential for loading and unloading purposes inasmuch as the tractor must be utilized as continuously as possible for hauling purposes in order to secure efficient operation. When the semi-trailer is to be moved the tractor is backed up under the front end of the trailer and it is customary to provide cooperating means on both tractor and trailer whereby this backing movement functions to raise the front end of the trailer off of its supporting legs into a position where it rests upon the rear end of the tractor.

After this operation the two ends of the vehicles are coupled to one another in various ways to permit the tractor to draw the trailer.

In my improved structure I provide the rear end 10 of the tractor with a raised platform 12 which is composed of a flanged plate member 14. This flanged plate member is secured to the frame of the tractor in any desired manner, as by means of the rivets 16. The extreme rear end of the raised platform 12 slopes downwardly as at 18 across its entire width to provide a sloping guideway.

Secured longitudinally to the under face of member 14 are Z-shaped brackets 20 and 22. These brackets are so spaced as to form a guide chamber extending centrally of the member 14 throughout a portion of its length. Securely positioned at spaced apart positions within this guide chamber are blocks 24 and 26, the bolts 28 and 30 being utilized to position the element. A third block 32 is free to slide within the guide chamber and the ball 34 is secured thereto by means of the nut 36. The shank 38 of ball 34 extends through an elongated slot 40 in the top of flanged plate 14. Blocks 24 and 26 are provided with projecting studs 42 and 44 respectively, while each end of block 32 is provided with similar studs 46 and 48. These studs constitute seats for opposite extremities of coil springs 50 and 52 and in this way the ball 34 is free to slide to a limited extent longitudinally in either direction within the slot 40.

A trough-like member 54 which constitutes an arcuate bearing surface is secured to the underside of the front of the trailer vehicle frame 56 and extends across a portion of the width thereof. A fixed portion 58 of the ball socket is secured to the upper rear face of member 54 by means such as the bolts 60, the forward face 62 of said socket member 58 being adapted to seat the ball 34 snugly about a portion of the spherical surface thereof. A pair of arms 64 and 66 are secured, as by spot welding, along the under portion of frame 56, as clearly indicated in Fig. 2. The forward portion of member 54 is provided with a substantially V-shaped cut away portion 65, the side marginal portions 67 and 68 of which are bent outwardly to form a guide way for the ball 34 as the same approaches its socket.

The movable member 70 of the socket, which is comprised of a web shaped portion 72 and a socket face 74, which is adapted to embrace a portion of the spherical surface of the ball 34, is journalled for rotation between the arms 64 and 66 by means of the bearing arms 76 and 78. The web shaped portion 72 has a central flange 79 which is provided with an eyelet 80 at its extremity. A coil spring 82 connects the web member 72 with the front frame channel 84 as clearly indicated in Figs. 2 and 5.

Bearing arm 76 is provided with a square aperture into which the square extremity 86 of shaft 88 is adapted to seat. The other extremity of shaft 88 is journalled in a depending bracket 90 which is secured to an outer trailer frame channel 92, as by the rivets 94. A handle 96 is keyed to the shaft, this handle constituting the means for positively actuating the movable socket member 70. Toward its outer extremity handle 96 is provided with an aperture 98 adapted to aline with apertures in the depending arms 100 and 102 of a U-shaped bracket 104 which is secured to the lower flange of channel 92, as by the bolt 106.

The full line position of the handle indicated in Fig. 1 represents the position thereof when the movable socket member 70 is in a position to positively retain the ball within the socket or, in other words, in locked position. A pin 108, secured to the trailer frame in any desired manner may be inserted through the alined holes in arms 100 and 102 and hole 98 of the handle 96 to secure them in their full line position. Should it prove desirable to lock the handle in its dotted line position, in which position the movable socket member 70 is adapted to permit unobstructed removal of the ball 34 from the socket, the aperture 110 may be locked by means of a pin as heretofore described in regard to the full line position.

Operation of the coupling mechanism will be apparent from the foregoing description. As the tractor vehicle is backed under the trailer the lowermost portion of the trough like member 54 slides up the guide 18 into the position indicated in Fig. 7. In this position the bottom of the member 54 has a bearing upon the top of the raised platform 12 substantially throughout its entire width. As the tractor is further backed the ball 34 will be guided by means of the flanges 66 and 68 to a position indicated in Fig. 5 by the dotted ball at the extreme right thereof. At this point it will bear against the web portion 72 of movable socket element 70 and begin to rotate the latter about its bearing arms 76 and 78 as an axis. An intermediate position is illustrated by the second, or left, dotted ball, at which point the movable socket element 70 has reached the perpendicular position indicated in dotted lines in Fig. 5, its direction of movement being indicated by the arrow 112. Still further rearward movement of the tractor and ball will bring the latter to rest against the face 62 of the fixed socket element 58 and the movable socket member 70 will have reached the limit of its movement in that direction. This movement is limited by the stop face 116 of fixed socket member 58, in which the hub 118 of the movable socket 70 is adapted to rest. Having reached this point the spring 82 will draw the movable socket element 70 back into its initial position whereby the ball is firmly locked within the socket so provided. The tractor and trailer are now coupled and it will be seen that the ball and socket permit swivelling movement between the tractor and trailer, the trough like member 54 having a substantial bearing surface on the plate member 14 at all times to provide a four point suspension, so to speak, for the front end of the trailer. Through the arcuate supporting surface of the trough like member 54 a rocking movement between it and the plate without any substantial frictional resistance whatsoever is rendered possible. In other words, two integral rigid members, plate 14 and the trough like member 54, provide a universal coupling of a simplicity hitherto unknown and efficient in operation.

To provide further security against possible uncoupling, the movable socket member 70 may be locked in position by means of the pin 108 hitherto described. This is not essential, however, inasmuch as the coupling so provided is substantially proof against uncoupling without the precaution of providing a positive lock. Thus it is apparent that the coupling takes place automatically and the only time when it is necessary to actuate the movable socket element 70 is when release of the ball from the socket is desired. At that time the element 70 is actuated by means of the handle 96 to permit withdrawal of the tractor and ball from the trailer socket.

The yielding seat for ball 34 provided by springs 50 and 52 absorbs jarring which would normally be transmitted to the trailer and its load upon retardation and acceleration of the tractor, and also absorbs the shock of coupling. The most delicate goods may be carried by the trailer with the assurance that there will be no jar during coupling or hauling of the trailer which would endanger its load.

In the drawings the supporting plate 14 and its associated ball 34 are illustrated in conjunction with the tractor while the trough like member including its ball socket are carried by the trailer. It will be understood that these elements may be reversed and the coupling will function equally satisfactorily. Inasmuch as the majority of tractor trailer coupling mechanisms now in use carry the ball upon the front end of the trailer and a socket arrangement upon the tractor, I contemplate reversing the parts as illustrated so that an inverted trough like structure 54 will be positioned upon the rear end of the tractor operable to receive the ball on the front end of the trailer. It will furthermore be understood that my invention contemplates not only the use of a continuous arcuate surface extending laterally across a substantial portion of the width of either the tractor or the trailer, but also the use of spaced apart arcuate rocking members located on each side of the ball socket, and such structure would function equally well and the arrangement is simply a matter of choice. The important feature resides in the provision of spaced apart arcuate supporting surfaces adapted to cooperate with a plane surface and having socket mechanism arranged therebetween.

While I have illustrated a preferred embodiment of my improved structure various others will be apparent to those skilled in the art and for that reason I intend to limit myself only within the scope of the appended claims.

I claim:

1. In combination with a vehicle adapted to be coupled to another vehicle, a laterally extending arcuate bearing surface secured to the underside of said vehicle, one of two component portions of a composite socket secured to the concave face of said bearing intermediate its ends, a pair of spaced apart arms secured to the underside of said vehicle and extending transversely of the length of said bearing, and a second component socket element pivotally mounted between said arms in operative relation to said first mentioned composite element.

2. In combination with a vehicle adapted to be coupled to another vehicle, a laterally extending arcuate bearing surface secured to the underside of said vehicle, one of two component portions of a composite socket secured to the concave face of said bearing intermediate its ends, a pair of spaced apart arms secured to the underside of said vehicle and extending transversely of the length of said bearing, a second component socket element pivotally mounted between said arms in operative relation to said first mentioned composite element, and a cut away portion in the forward central part of said arcuate surface, said cut away portion being bent under along opposed edges thereof to form a guide way for the element to be positioned within said socket.

3. In combination with a vehicle adapted to be coupled to another vehicle, a laterally extending arcuate bearing surface secured to the underside of said vehicle, one of two component portions of a composite socket secured to the concave face of said bearing intermediate its ends, a pair of spaced apart arms secured to the underside of said vehicle and extending transversely of the length of said bearing, a second component socket element pivotally mounted between said arms in operative relation to said first mentioned composite element, and a shaft journalled on one side of the vehicle frame for rotation therein having one extremity fixedly secured to the pivotal point of said pivoted component socket element whereby the latter may be manually actuated.

4. In combination with a vehicle adapted to be coupled to another vehicle, a laterally extending arcuate bearing surface secured to the underside of said vehicle, one of two component portions of a composite socket secured to the concave face of said bearing intermediate its ends, a pair of spaced apart arms secured to the underside of said vehicle and extending transversely of the length of said bearing, a second component socket element pivotally mounted between said arms in operative relation to said first mentioned composite element, a shaft journalled on one side of the vehicle frame for rotation therein having one extremity fixedly secured to the pivotal point of said pivoted component socket element whereby the latter may be manually actuated, and means associated with said shaft adjacent the journalled portion thereof and co-operable with said vehicle frame for locking the shaft against rotation.

5. Mechanism for supportably coupling two vehicles together comprising, in combination, a flat bearing surface on one of said vehicles, a rounded bearing surface on the other of said vehicles extending a substantial portion of the width thereof and adapted to make line contact with said flat bearing surface to support one vehicle in overlapping relation on the other, a slot in the forward portion of the rounded bearing surface having converging side walls terminating in a socket rearwardly thereof, a member yieldably mounted astride the slot and having a segmental portion forming a component part of the socket, and a ball element extending from the surface of the flat bearing surface adapted to be guided through the slot into the socket when the bearing surfaces are brought into contact supporting relationship, said member being yieldable to permit entrance of said ball element through the slot and into the socket but preventing withdrawal of said ball element thereby coupling said vehicles together.

6. Mechanism for supportably coupling two vehicles together including, in combination, a hollow arcuate bearing structure on one of said vehicles having a bearing apex extending laterally across the vehicle for a substantial portion of its width, a slot in the forward portion of said arcuate structure having converging side walls terminating in a socket positioned at the bearing apex of said arcuate structure, a member pivotally mounted in said structure on an axis extending radially with respect to said socket and parallel to the bearing apex of said arcuate structure, said member having a segmental portion forming a component part of said socket and having a flange portion adapted to lie astride the slot, said member adapted upon engagement with coupling mechanism entering said slot to pivot about its axis permitting the coupling mechanism to enter said socket.

7. Mechanism for supportably coupling two vehicles in overlapping relationship comprising, in combination, a flat bearing surface on one of said vehicles having a ball element protruding therefrom, a rounded bearing surface on the other of said vehicles adapted to make bearing contact at the apex of said rounded surface, a slot in said rounded surface on one side of the apex thereof having converging walls terminating in a socket positioned at the bearing apex of said rounded surface, a segmental portion of said socket pivotally mounted on either side of said socket and provided with a flange yieldably restrained to lie across said slot, said segmental portion adapted upon engagement of said ball with said flange to move on its pivot in an arcuate path about said socket to permit the ball to seat therein and further adapted upon seating of the ball within the socket to return to its normal restrained position locking the ball within the socket.

RALPH E. LEPPO.